United States Patent [19]
Lahey et al.

[11] Patent Number: 6,092,089
[45] Date of Patent: Jul. 18, 2000

[54] AUGMENTING COMMENT FIELD OF POSTSCRIPT FILES TO ENABLE DOCUMENT MANAGEMENT

[75] Inventors: L. Corning Lahey; Arthur R. Roberts, both of Boulder; Robert W. Peverly, Louisville, all of Colo.; Mahesh Viswanathan, Yorktown Heights, N.Y.

[73] Assignee: International Business Machines Corp., Armonk, N.Y.

[21] Appl. No.: 08/891,861

[22] Filed: Jul. 9, 1997

[51] Int. Cl.[7] .................................................... G06F 17/21
[52] U.S. Cl. ............................................. 707/511; 707/513
[58] Field of Search ...................................... 707/513, 500, 707/511

[56] References Cited

U.S. PATENT DOCUMENTS

| | | | |
|---|---|---|---|
| 5,319,748 | 6/1994 | Montoyama | 395/162 |
| 5,325,484 | 6/1994 | Montoyama | 395/162 |
| 5,353,388 | 10/1994 | Montjoyama | 395/117 |
| 5,416,896 | 5/1995 | Montoyama | 395/145 |
| 5,422,992 | 6/1995 | Montoyama et al. | 395/144 |
| 5,438,650 | 8/1995 | Motoyama et al. | 395/114 |
| 5,487,165 | 1/1996 | Tsay et al. | 395/600 |
| 5,841,900 | 11/1998 | Rahgozar et al. | 382/176 |
| 5,873,097 | 2/1999 | Harris et al. | 707/203 |

OTHER PUBLICATIONS

William J. Maccalpin, AFP and ImagPlus' MO:DCA; Enterprise Systems Journal, vol. 10, No. 6, p. 56(4), Jun. 1995.

M.C. Bailey and R.E. Bolton, "Generalized Markup Integrates Automatically Generated Reports with a Text Processing System," IBM Technical Disclosure Bulletin, vol. 22 No. 11 Apr. 1980, pp. 5129–5130.

D. Wagner, "Search Algorithm for Advanced Function Printing Data Stream Resources," IBM Technical Disclosure Bulletin, vol. 36 No. 10 Oct. 1993, pp. 27–28.

W. Chen, A.Herzog, J.W. Marlin and D.E. Stone, "Advanced Function Printing Presentation of Human–Readable Data along with Multiple–up Data Pages," IBM Technical Disclosure Bulletin, vol. 36 No. 11 Nov. 1993, pp. 573–576.

B.A. Black, B.E. Haan, D.R. Tanigawa and H.L. Turetzky, "Indexing Input Line Data to AFPDS/MODCA Output," IBM Technical Disclosure Bulletin, vol. 376 No. 02B Feb. 1994, pp. 315–316.

D.R. Palmer, "Using PostScript Resources in Advanced Function Printing," IBM Technical Disclosure Bulletin, vol. 38, No. 01 Jan. 1995, pp. 287–288.

L.C. Lahey, R. Peverley and M. Viswanathan, "Technique for Splitting Printjobs in a Print–on–Demand System," IBM Technical Disclosure Bulletin, vol. 38 No. 10 Oct. 1995, pp. 89–90.

L.C. Lahey, R. Peverley and M. Viswanathan, "Technique for Inserting Tab Pages into Print–on–Demand System Advanced Function Printing Printer," IBM Techical Disclosure Bulletin, vol. 38 No. 10 Oct. 1995, pp. 201–202.

L.C. Lahey, R. Peverley and M. Viswanathan, "Technique for Identifying Printfile Destinations using the Print Services Facility/6000 Separtor Page," IBM Technical Disclosure Bulletin, vol. 38 No. 10 Oct. 1995, pp. 551–552.

*Primary Examiner*—Joseph H. Feild
*Assistant Examiner*—Robert D Bourque
*Attorney, Agent, or Firm*—Charles E. Rohrer

[57] ABSTRACT

A marking system is provided within the comment field of PostScript page files to identify document management data placed therein. A special processor is provided to recognize the signature of document management data so that page characteristic records can be created. The page characteristic records are stored in a database thereby enabling a management system based upon the page characteristic records. The marking system includes a prefix, for example, "%%" and a keyword, for example, "OutputTagElement:", followed by a "tag" which is a management data attribute. The tags are processed to fill data fields in the created page characteristic records.

18 Claims, 9 Drawing Sheets

AUGMENTING COMMENT FIELD OF POSTSCRIPT FILES TO ENABLE DOCUMENT MANAGEMENT

CROSS-REFERENCE TO RELATED PATENT APPLICATION

U.S. patent application Ser. No. 08/891,860, filed concurrently herewith, relates to a system for managing documents so that cost effective retrieval of any version or part thereof is enabled.

This invention relates to the marking of data in comment fields of PostScript page files so that page characteristic data can be created and stored for document management at the page level.

BACKGROUND OF THE INVENTION

Large volumes of printed matter are usually produced by a process such as offset printing. In offset printing, plates are produced for each page and the high initial cost associated with the production of plates is recovered by the large volume of pages produced from each plate. However, for low volume production, offset printing is expensive. Publications such as tax guides, patent examining guides, and many other similar publications, often using ring binders, may have relatively small portions of the whole publication updated and changed on a rather frequent basis. In such cases, offset printing of the updated material may not be economical. For low volume printing, computerized print-on-demand systems, frequently utilizing electrophotographic technology, are considerably cheaper than offset printing.

Another cost factor in the publishing industry is the labor intensive nature of the operation, that is, when a document is produced, sometimes comprising several hundred pages, the plates that produced those pages may be stored so that if the document is later out of print, the plates can be retrieved to produce a new edition. In addition to storing plates, after printing the publication the pages must also be stored in a warehouse so that subsequent orders can be satisfied. Retrieving documents from a warehouse is labor intensive, particularly where the document includes frequent revisions. Those revisions must also be printed, stored and retrieved to satisfy customer requirements which may include the latest version, an earlier version, only the changed pages of the latest version, or a sub-portion of a current or old version. After many iterations of this procedure, the result is several versions and changed pages all of which are stored in a warehouse. When a customer request is received, it requires locating the correct pages in the warehouse and assembling them to meet the order. The process is not only labor intensive, it is subject to human error. For insurance companies, assembling a policy often requires printing different versions of the same clause for different jurisdictions. Over a period of time, storage of policies and variations of them fill large warehouses. Print-on-demand systems avoid the warehousing of documents but fail to provide a convenient management system for the retrieval and printing of a particular version or part thereof.

The solution to these problems is to create and maintain a document database, using the power and flexibility of the database to manage the production of documents to satisfy customer needs. In such manner, the document version or portion thereof can be retrieved at a later point in time for printing by the most economical process, either offset printing or print-on-demand. In providing such a database, document records, version records, and page records for each page are created and maintained. These records are searched in the database to identify a list of pages needed to satisfy a customer request.

One of the most common languages and datastreams for producing documents to be printed has been "PostScript." However, PostScript, as well as many other source languages, fails to provide a vehicle for creating and maintaining the records needed for a management system to retrieve the required pages to meet a print request for a customer. This invention provides a solution to the problem by utilizing the comment field of the PostScript page files to enable the editor or author to provide document management data. PostScript comment fields are ordinarily ignored by PostScript interpreters in the preparation of page image files for printing since only the contents of the page are printed, not comments. Therefore, prior art interpreters do not provide a vehicle for the processing of management information located in comment fields. The object of this invention is to provide a marking technique to identify those portions of the comment field of PostScript page files which contain document management information and to provide special processing capability to identify those marks and create page characteristic records for storage in a database. The document management data will continue to be ignored in the preparation of a page image file.

SUMMARY OF THE INVENTION

This invention places a signature in the PostScript data stream within the comment fields of the PostScript page files to identify document management data. An example of a mark which provides a signature is the otherwise meaningless repetition of a percent sign, %%. The two "percent signs" together are placed at the beginning of a line in the comment field and are recognized as a prefix by special processing elements so that the line is identified as a line including document management data. The signature also has a keyword following the prefix which is "OutputTagElement:" followed by a tag. The tag is a meaningful document management data attribute which the special processing elements use to fill appropriate fields in a page characteristic record. The invention provides processing interpretation of the PostScript data stream at a gateway to the database so that the document management data can be identified from the data stream for building page characteristic records for storage into the database. The page characteristic records include attributes which are searched to locate those pages needed to satisfy a print request. The page characteristic records also carry a pointer to the storage location of the corresponding page file having the page content wherein retrieval of the page file is accomplished for print-on-demand printing or for burning a new plate for offset printing. The pointer may also identify the whereabouts of a previously prepared plate.

The above mentioned and other features and objects of this invention and the manner of obtaining them will become more apparent, and the invention itself will best be understood by reference to the following description of embodiments of the invention taken in conjunction with the accompanying drawing, a description of which follows.

BRIEF DESCRIPTION OF THE DRAWING

FIG. 10 pertains to the case where a particular version is specified by the customer and FIG. 11 pertains to the case where the customer specifies a version as of a particular date.

DETAILED DESCRIPTION

Figure 1:
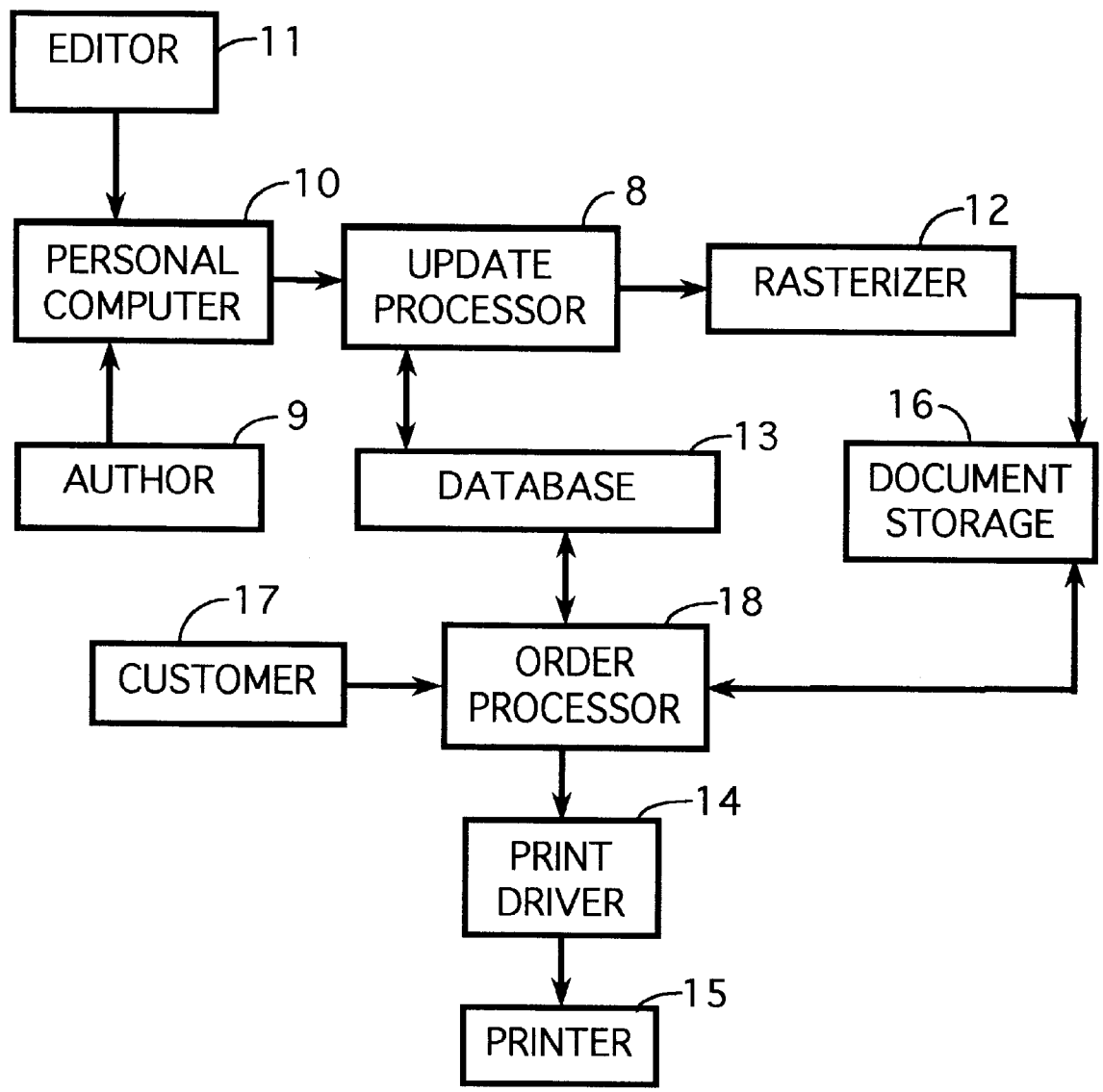
FIG. 1 is a block diagram showing the elements of a print-on-demand printing system.

FIG. 1 shows a print-on-demand system including a personal computer 10 such as an IBM PS-2 for interacting with an author 9 or an editor 11 in the creation of the pages of a document. The document created at the personal computer may be placed in appropriate page source files for printing such as PostScript page files. Once generated, the page source files are sent to an update processor 8 for creating page characteristic records for storage in database 13. Update processor 8 also provides the page source files to rasterizer processor 12 whose function is to generate page image files (bitmaps) of each page of the document. These page image files are used by a print driver 14 to drive the printer 15 in the production of the printed output. In this embodiment of the invention, however, the page image files generated by the rasterizer are placed into the database 13 or into document storage 16 and stored there until a print request is received from a customer 17. When received, access is made to the database by the order processor 18 in order to retrieve the desired page image files and have them printed. The update processor 8, the rasterizer processor 12 and the print driver 14 may reside on computers such as the IBM RISC 6000. The database 13 may be a relational database such as the IBM DB2. Such databases have sophisticated data mapping techniques and sophisticated search engines which typically utilize the Structured Query Language (SQL) to field and process database queries. The printer 15 may be an electrophotographic printer such as the IBM 3900 printer. Print driver 14 may utilize a system such as the IBM Print Services Facility (PSF). If page source files are stored instead of page image files, a rasterizer at print driver 14 or printer 15 may produce the page image files needed for printing at print time.

In order to achieve management of the page image files or page source files stored in the database 13 or in storage 16, the invention herein provides document management information in the print stream of the page source file generated at the personal computer 10. For example, if the document is generated in PostScript page files, document management information to uniquely identify each PostScript page is placed in the comment field of each PostScript page file and is sent from computer 10 to the update processor 8 for inclusion in the database 13. In that manner, information needed to manage the retrieval and printing of particular page image files is included in the database and may be searched to retrieve a list of those pages required to satisfy a print request. While any needed information to manage the documents may be included in the comment field of the PostScript page file, the invention is described with illustrative page characteristic records shown in FIGS. 2, 3 and 4.

Figure 2:
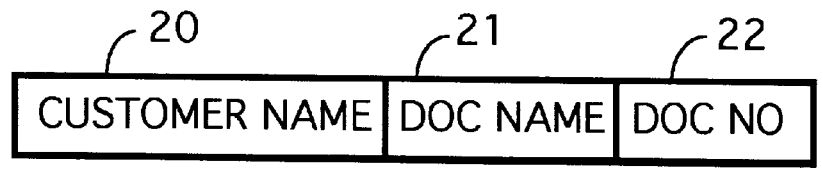
FIGS. 2, 3, and 4 are, respectively, a document record, a version record, and a page record for pages in a document.
Figure 3:
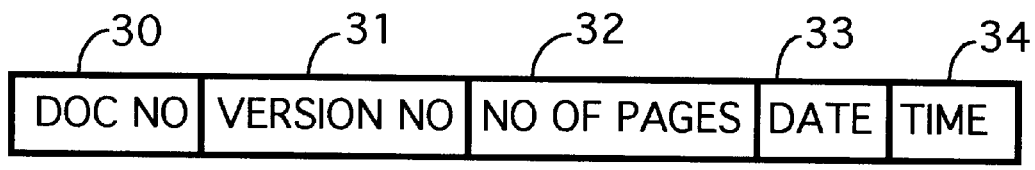
Figure 4:
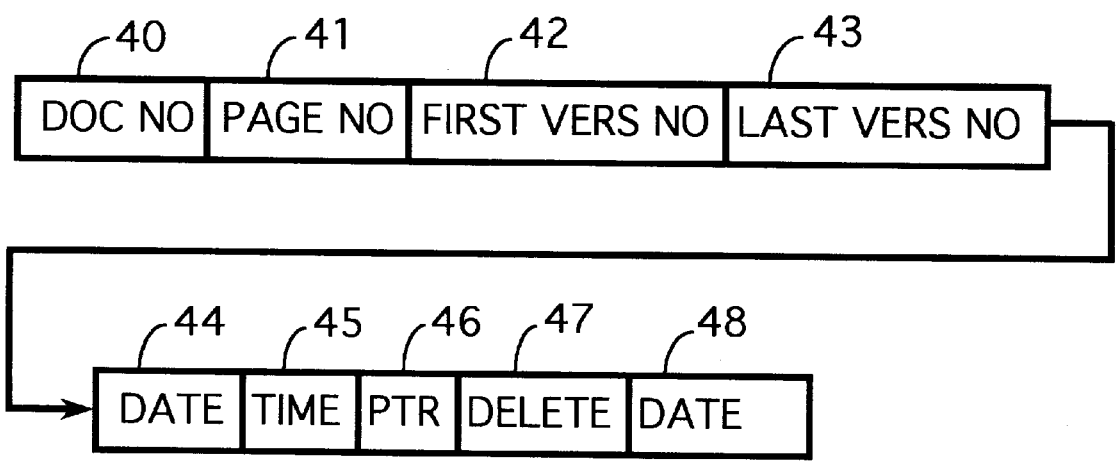

The term page characteristic record is used herein as a term to identify a document record, version record or a page record. FIG. 2 shows a document record with a field 20 which identifies the customer's name, the document name field 21 and a document number field 22. FIG. 3 shows a version record with fields identifying the document number 30, the version number 31, a field 32 for the number of pages in the version and the date and time fields 33 and 34 when the version was submitted. FIG. 4, a page record, has a document number field 40, the page number field 41, the initial version number field 42 which shows when the particular page was first included in the document, the last version number field 43 which shows the version number in which the particular page was last included and the date and time fields 44 and 45 showing when the record was created. The pointer field 46 contains the storage address of the corresponding page file. The delete field 47 is used to flag the particular page when it is deleted from a new version and the delete date field 48 identifies the date when the page was deleted.

Normally, interpreters of PostScript page files to produce page images for printing ignore all comments. However, in the inventive system the update processor is enabled to read the PostScript headers and find the data needed to create or update the page characteristic records. To do that, a signature is included in the comment field used to build the records; the signature is intended to provide the update processor with the means for identifying document management data so that it can create the page characteristic records needed to manage the order process.

An example PostScript commenting structure to implement the invention is:

%%OutputTagElement:tag such that "tag" would be meaningful document management data. In order to be as general as possible, error checking of the commenting structure is not performed at the interpreter level, but rather at a higher system level. Thus, the meaning of "tag" at the interpreter level could be anything including Double Byte Character Set (DBCS) information, and is passed as is into the output data stream. The signature field is used to identify data following the signature as document management data. In the example the signature is "%%OutputTagElement:" where %% is the PostScript File comment prefix and OutputTagElement is the keyword. The update processor can use a string matching algorithm, such as the Bayer-Moore algorithm to identify the signature. The tag can contain any character code except the carriage return (CR) character or the line feed (LF) character. Either of those two characters terminate the tag information.

An example is:

%%Page 10 10
%%OutputTagElement:product=reporter
%%OutputTagElement:volume=sf23261
%%OutputTagElement:folio=sf23261.dat
%%OutputTagElement:page_number=23261
%%OutputTagElement:version=089-0
%%OutputTagElement:release_date=220994
%%OutputTagElement:release_time=16:24

In this invention the page characteristic records are created by the update processor from the document management data and stored with a pointer to the corresponding page file having the content data (page image file or page source file.) The page file can is later be retrieved using the page characteristic record attributes. These attributes will correspond to the tags of the pages created when the document was composed by the author or editor in a page source file such as a PostScript page file. It should be noted that since the document management data are part of the PostScript comment structure, document management data are ignored by other PostScript devices which ignore comments, such as the rasterizer 12.

In addition to header information for each page file created at computer 10, the editor will also create a separate instruction file when updates are created. The separate file, called a Document Update Instruction (DUI) file, contains instructions for adding data to database 13. The list of instructions may be as follows:

ADD DOC1 VERS 4 PAGE 1.2.1 DATE TIME FILENAME

DELETE DOC1 VERS 4 PAGE 6.2.4 DATE TIME

REPLACE DOC1 VERS 4 PAGE 4.2 DATE TIME FILENAME

The ADD instruction identifies the document, version and the page sequence number for the new page together with the date, time and filename of the new page. The DELETE instruction identifies the document, version and page number of the page to be deleted. The REPLACE instruction identifies the document, version and page number of the page being replaced by an updated page together with the filename of the replacement page. It should be observed that all deleted and replaced pages are retained in the database 13 or in document storage 16 so that accurate retrieval of out-of-date versions can be accomplished at any later point in time to satisfy a customer request.

Figure 5:
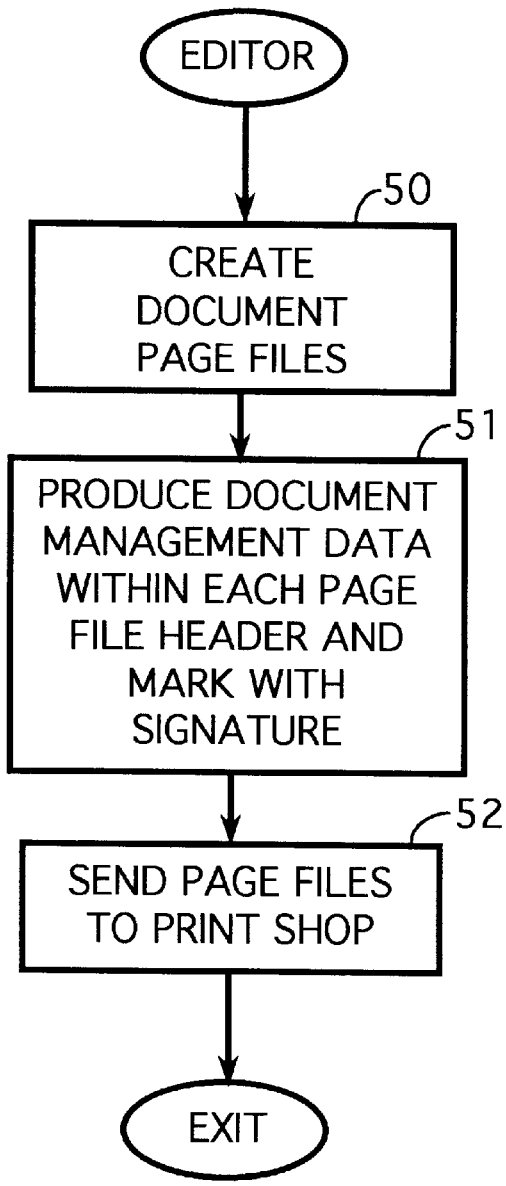
FIGS. 5 and 6 are flowcharts of initial document and page characteristic record creation and storage in the database.
Figure 6:
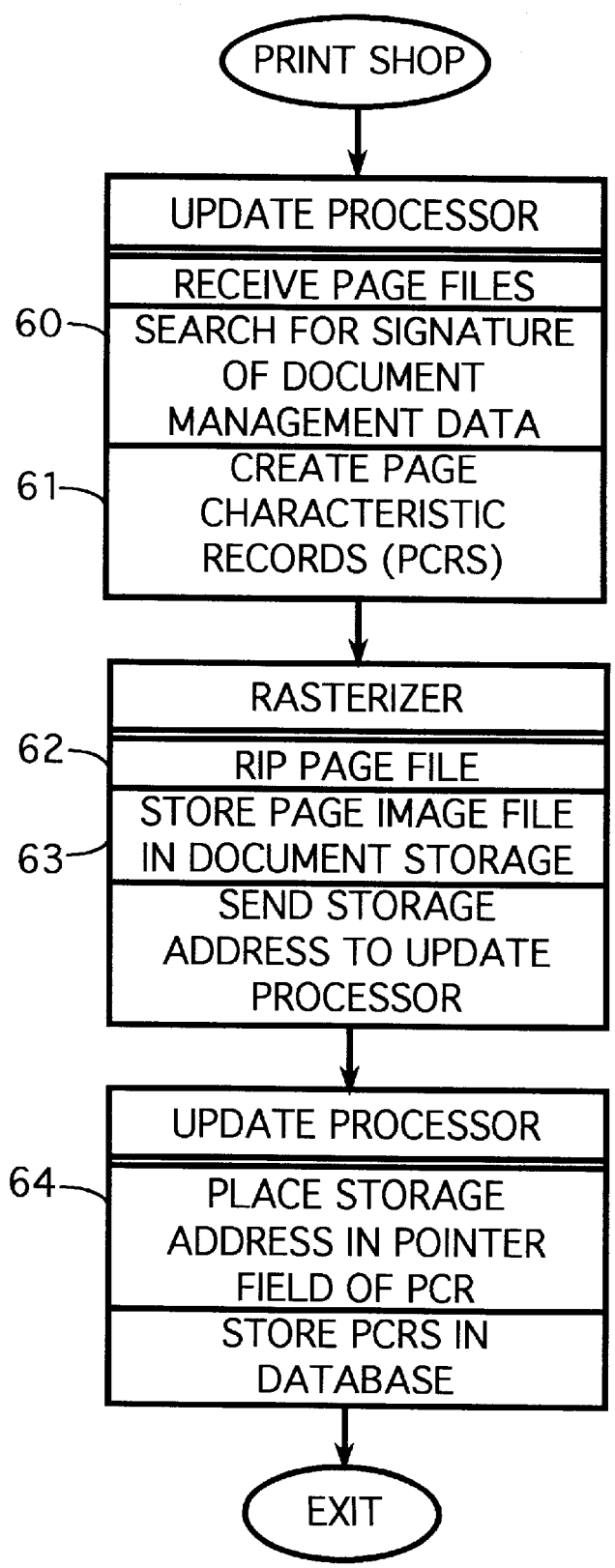

FIGS. 5 and 6 are flowcharts of the manner in which a document is initially created and stored in database 13. A DUI file is not needed for the initial version but document management data is included in the header so that the update processor 8 can create the document record, the version record, and the page record for each original page. FIG. 5 shows the activities carried out at the editor while FIG. 6 shows the activities carried out at the update processor 8.

In FIG. 5, the document is created at step 50 and document management data together with the signature which identifies them as document management data, are created at step 51. Next the page files including headers are sent to the update processor as shown in step 52. The update processor will probably be located at the print shop.

At the update processor, the data stream is searched at step 60 for the signature of document management data in order to identify that data and build page characteristic records therefrom at step 61. Once the page characteristic records have been built, the document is sent to the rasterizer processor and rasterized at step 62 to produce page image files of each page. The page image files are stored in database 13 or in document storage 16 at step 63. A pointer to the storage location of each page image file is included in the page record stored in database 13 at step 64. In that manner, each separate page image file of the document is stored as well as the page characteristic records that are needed to identify that page image file and retrieve it in order to satisfy a print request received at some future time.

In the document production process, authors and editors frequently make changes to the initial document. Those changed pages include updated pages and completely new pages as well as pages that are deleted. All of the changed pages must be identified for the next version and therefore a Document Update Instruction (DUI) file is created by the editor 11. Document management data for each new or updated page are also created by the editor and placed in the comment field with the signature identifying document management data.

Figure 7:
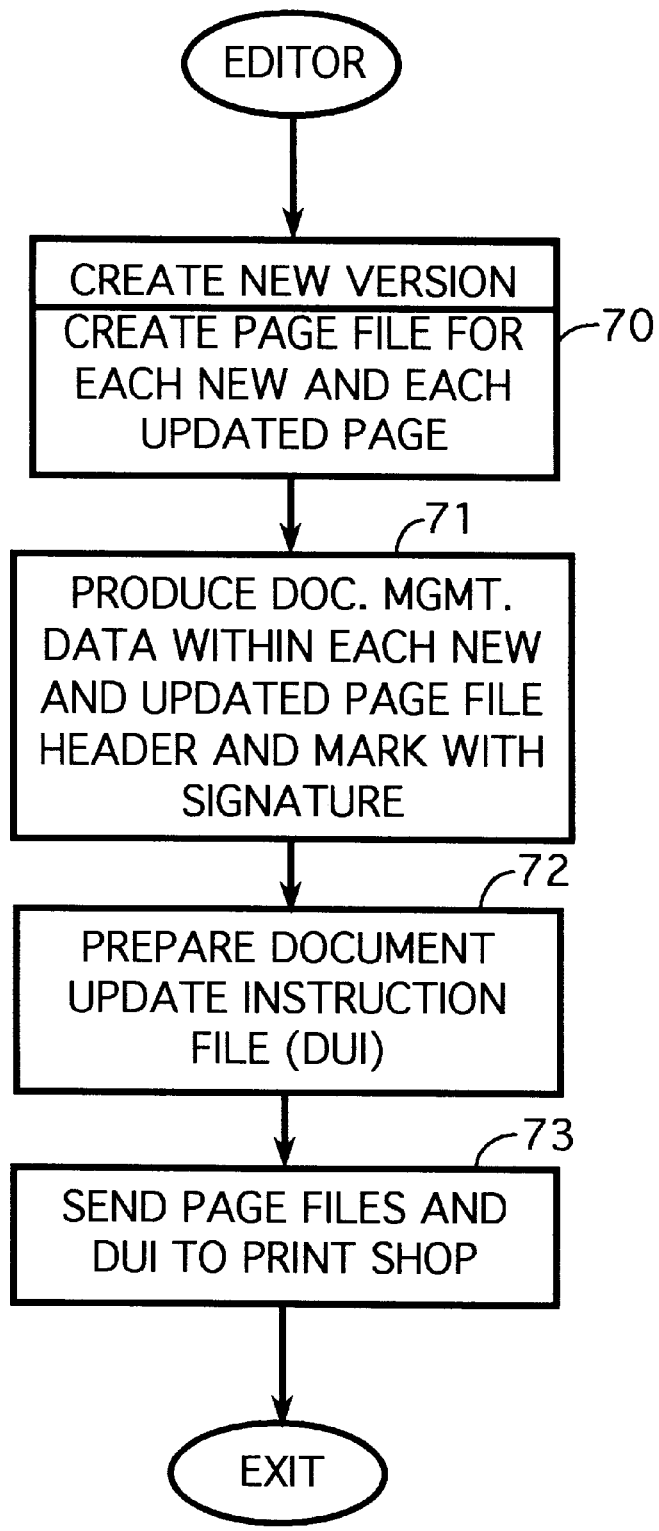
FIGS. 7 and 8 are flowcharts of the process for the creation of updated or new pages and the creation of corresponding page characteristic records for storing them in the database together with setting delete flags in the page characteristic records of those pages which are not used in the updated version.

FIG. 7 shows the updating process that is carried out at the personal computer 10. First, the updated pages and the new pages are created as shown at step 70. New document management data marked with a signature are created at step 71 and a DUI file created at step 72. At step 73, the new and updated page files and the DUI file are sent to the update processor 8.

Figure 8:
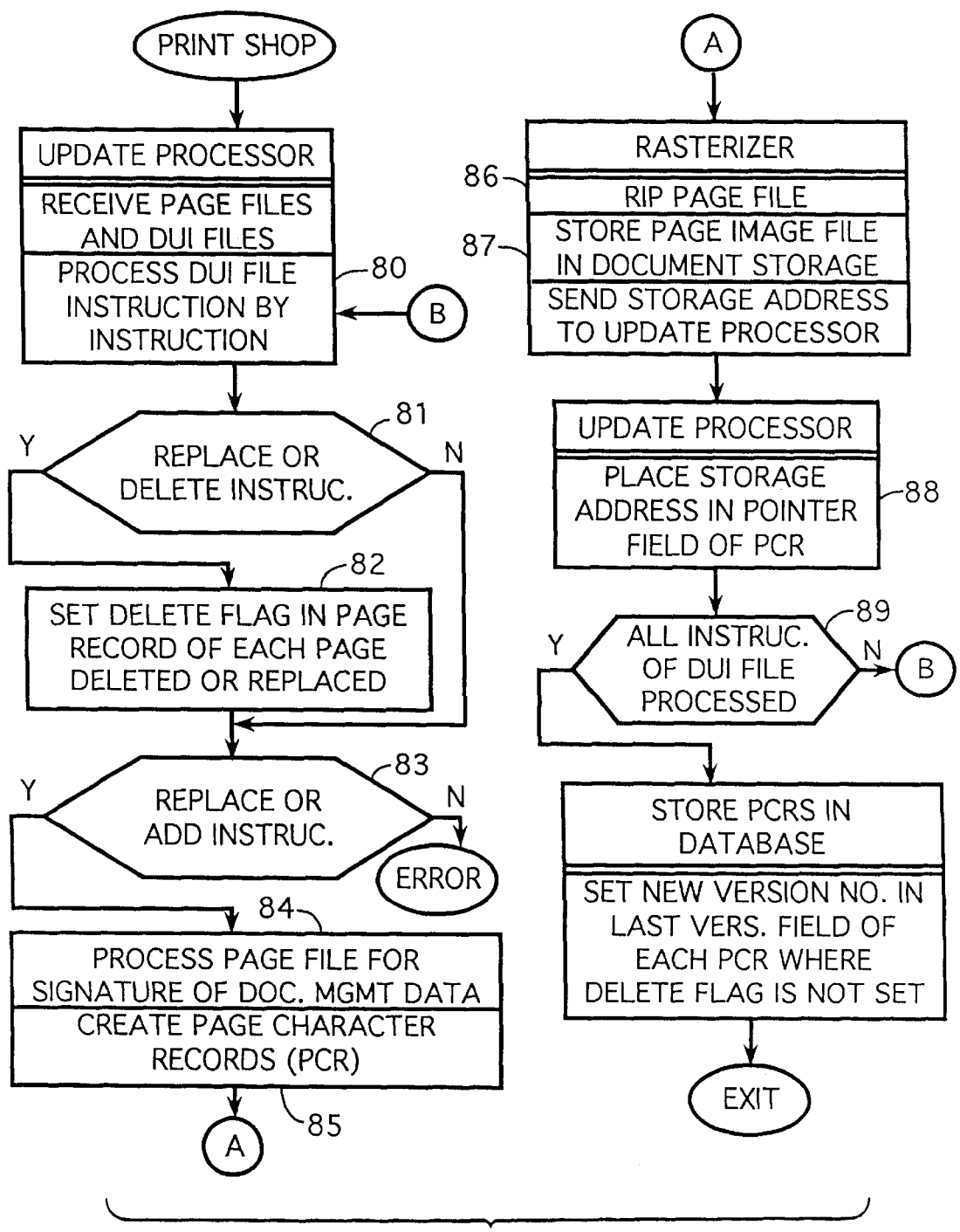

At the update processor, as shown in FIG. 8, the DUI file is processed line by line at step 80. At step 81, if it is determined that a replace instruction or delete instruction is present, the update processor will address the database at step 82 to update previously created page characteristic records to set delete flags in the page record of each page replaced or deleted in the new version. At step 83, if it is determined that an add or replace instruction is present, the page file identified by filename in the DUI instruction line is processed to search for the signature of document management data, step 84. Once found the update processor builds page characteristic records at step 85.

The new and updated pages are rasterized at step 86 to produce page image files of each new or updated page. At step 87, the new and updated page image files are stored in the database 13 or in document storage 16. A pointer to the storage location of the page image file is included in the page record in database 13 as shown at step 88.

Once all lines of instruction in the DUI file have been processed in the above described manner, as determined at step 89, the page characteristic records for the new pages in the new version are stored in database 13 at step 89A. At step 89B, the new version number is placed into the last version field of each page record of pages in the document where the delete flag is not set. By not setting the delete flag for those pages in the previous version which are repeated in the new version, they are identified and the last version field is updated accordingly.

Figure 9:
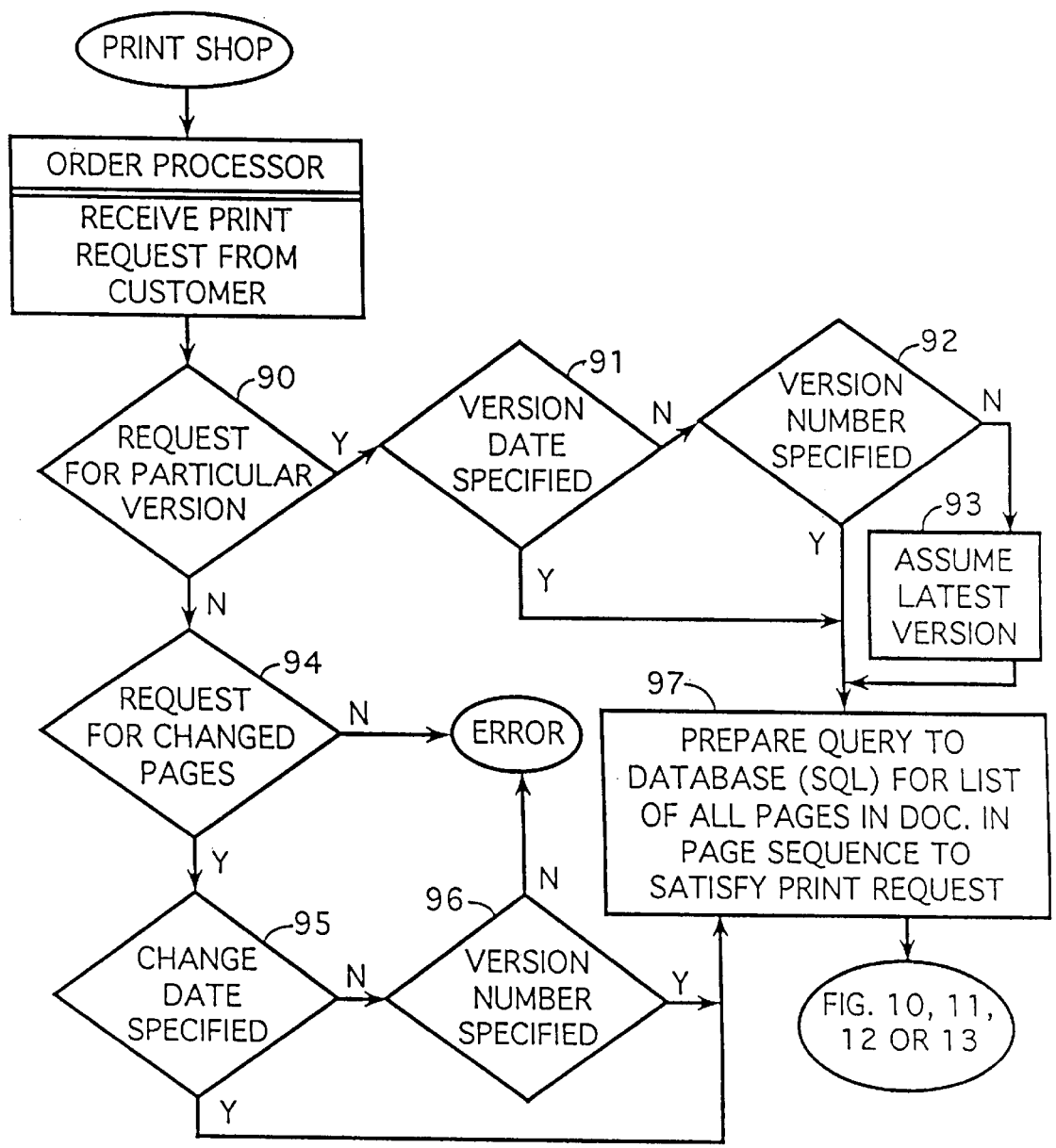
FIG. 9 shows illustrative customer order processing to make use of the page characteristic records created in FIGS. 5–8.

FIGS. 9–14 show the processing that occurs when a print request is received from a customer by the order processor 18. FIG. 9 shows the process for determining the nature of the print request in order to prepare the proper query for database 13. At step 90, it is determined whether the request is for a particular version of a document. If it is, at step 91, it is determined whether the date of the version has been specified by the customer. If it has, a query is prepared at step 97 to obtain a list of all pages current as of that date and a branch is made to the processing shown in FIG. 11. If the date has not been specified, then in step 92, the query is asked whether the customer specified the version number desired for printing. If it has not been specified, the latest version is assumed at step 93, and in either case, a query is prepared at step 97 to obtain a list of all pages in that version and a branch is made to the processing shown in FIG. 10.

If it had been determined at step 90 that the customer had not requested any specific version, then in step 94 the order processor determines whether the request has been for particular changed pages. If the request is for particular changed pages, at step 95 it is determined whether a date has been specified by the customer. If it has, a query is prepared at step 97 to obtain the changed pages and a branch is taken to FIG. 13. If no date was specified by the customer, at step 96 it is determined whether the customer has asked for changed pages in a particular version. If they are, a query is prepared at step 97 to obtain the changed pages and a branch is made to FIG. 12.

Figure 10:
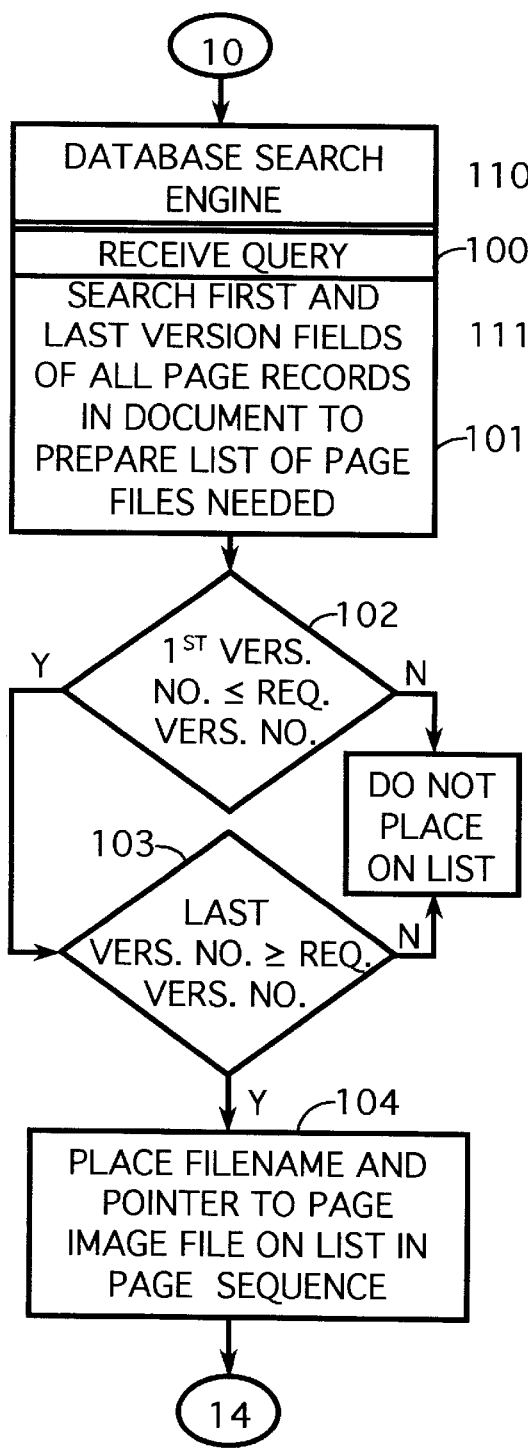
FIGS. 10 and 11 show processing for obtaining a list of pages to be printed for a particular version.

FIG. 9 is illustrative of some types of requests that can be fielded by the order processor of the invention but is far from all inclusive. If, for example, insurance clauses were being considered, then the order processor would determine whether the request was for clauses needed for a particular jurisdiction. The type of processing shown in FIG. 9 can be expanded greatly to cover any particular situation. FIG. 10 shows the processing carried out to obtain a list of page image files for a particular version when the version number has been specified in the customer request. At step 100, a query to the database is fielded and all page records in the document are retrieved in page sequence order. At step 101, the first and last version fields of all page records in the document are searched. At step 102, those certain pages are identified whose number in the first version field is equal to or less than the requested version number. For those certain pages, at step 103 the last version field is inspected to identify which of those certain pages have the further characteristic of a last version number equal to or greater than the requested version number. In that manner, the pages needed to satisfy the request are determined and the file name of each of those page image files is placed on a list and retrieved in page sequence as shown at step 104. A branch is taken to FIG. 14 where, at step 141, a printfile is assembled by retrieving all of the page image files on the list, and at step 142, the printfile is submitted to the print driver for the production of printed output.

Figure 11:
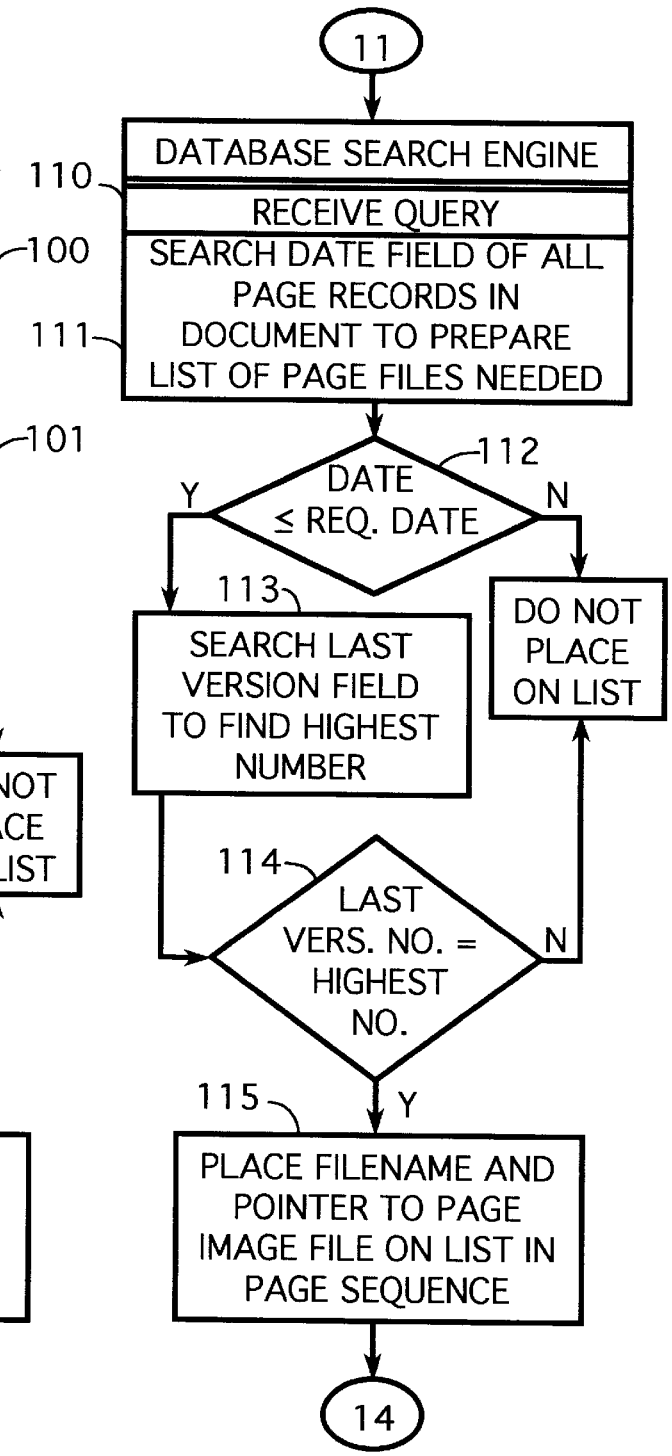

FIG. 11 shows the processing carried out to obtain a list of page image files to satisfy a request for a particular version current as of a certain date and where the customer request supplies the date of the version desired. At step 110, a query to the database is fielded to obtain all page records in the document in page sequence order. At step 111, the date field of all page records in the document is searched. At step 112, those certain pages are identified whose date in the date field is equal to or less than (i.e., before) the requested date. At step 113, the last version field of each of those certain pages is searched to identify the highest number in the last version field. At step 114, it is determined which of those certain pages have the further characteristic of a number in the last version field equal to the highest number. Those pages are placed on a list of page image files needed to satisfy the request at step 115 and a branch is taken to FIG. 14 where the page image files are retrieved from document storage at step 141 and submitted to the print driver at step 142.

Figures 12, 13:
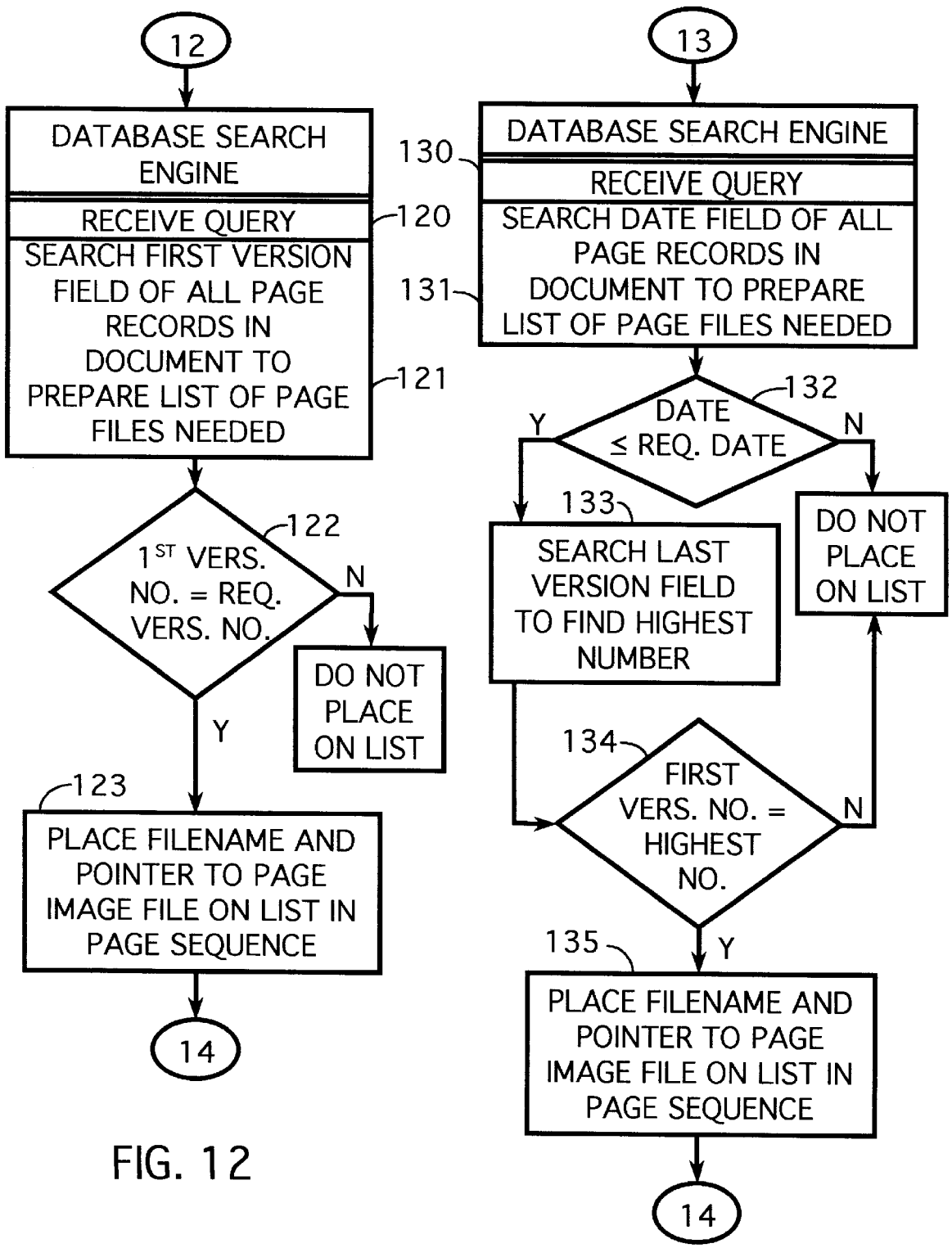
FIGS. 12 and 13 show processing for obtaining a list of the changed pages either in a particular version (FIG. 12) or in the version current as of a particular date (FIG. 13).
Figure 14:
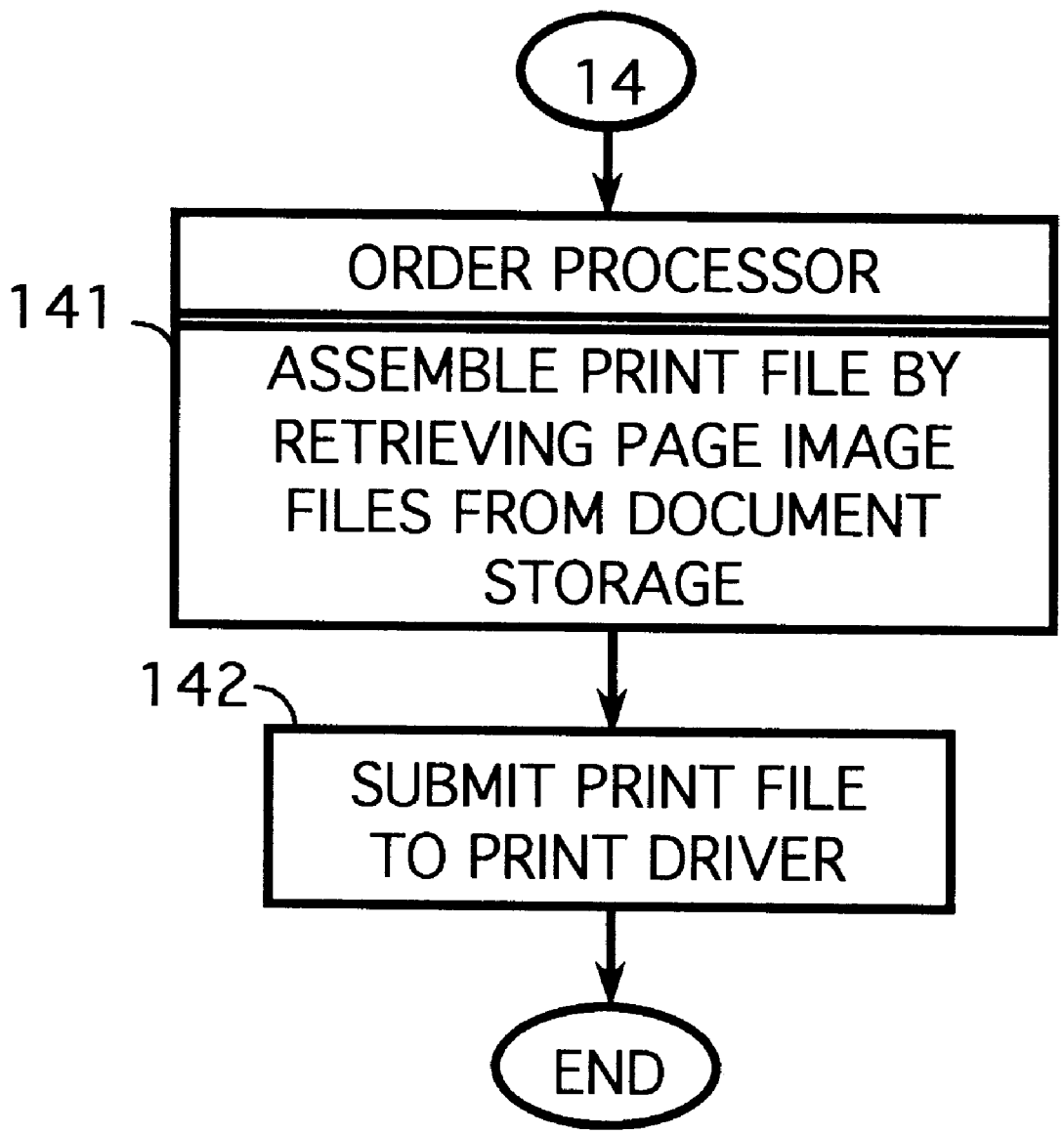
FIG. 14 is the completion of order processing once the pages needed to satisfy an order have been determined.

FIG. 12 shows the processing to produce a list of those page image files that comprise changed pages (new or updated pages) in a specific version named in the customer request. At step 120, a query to the database is fielded for a list of all pages in the document in page sequence order. At step 121, a search is made of the first version field of all page records in the document and a determination is made at step 122 whether the first version number is equal to the requested version number. Those pages in which the query at step 122 is satisfied are thus identified and at step 123 the file name of each of the identified pages is placed on the list in page sequence. A branch to FIG. 14 processes the list to retrieve the page image files at step 141 and assemble a printfile at step 142 to submit to the print driver.

FIG. 13 shows the process for obtaining the page image files (new or updated pages) changed in a version current as of a particular date specified by the customer. At step 130, a query to the database is fielded to obtain the page characteristic records for all pages in the document in page sequence order. At step 131, the date fields of all of the retrieved page characteristic records are searched, and at step 132, those certain page records are identified whose date is equal to or less than the requested date. For those certain pages identified in step 132, the first version field is searched at step 133 to identify the highest number present in the first version field. At step 134, it is determined which of those certain pages have the further characteristic of having a first version field number equal to the highest number determined at step 133. For those pages, at step 135 the file name of each page image file identified is placed on a list in page sequence. A branch to FIG. 14 processes the list at step 141 to retrieve the page image files and assemble them into a printfile. At step 142, the printfile is submitted to the print driver.

Maintaining a document database in the above described manner offers many advantages to the publisher. For example, if page image files are stored, the relatively slow process of rasterizing the PostScript page files to page image format occurs only once before entry into the database rather than at print time which could be a performance bottleneck. Also, with the inventive process, when changes are made to pages in a document, only the changed pages are resubmitted rather than the entire document. It can be important to have the opportunity to reprint old versions as well as the latest version; the invention provides a technique for doing that in a cost-effective fashion. Portions of a document can be reprinted since the level of granularity is a version of a page rather than an entire document. Note that information about other document pieces such as tabs, binders, inserts, etc. can be kept in the database by providing a page record for that document piece; for print-on-demand, this enables the printfile to include a marker for the location of those "external pages." Another advantage is that a print job can be held in a queue if an inventory item (such as an insert) is out of stock.

It should also be noted that document storage 16 can be managed so that infrequently used documents can be migrated to optical disk or tape storage but still recalled when a version of a document or book needs to be printed.

Pages can be stored in various fashions, but if page images of each page are stored, the fidelity of the printed document or book is enhanced when print-on-demand is utilized. There may still be some fidelity problems if the initial page image file was stored, for example, for use with a 300 dot per inch printer but is used on a 600 dot per inch printer at a later time. However, if the same printer is in use, the page will look exactly the same as it did earlier. To address the possibility of enhancements to printer resolution, it may be desirable to store the page source file as well as the page image file. In that manner, the page source file can be rerasterized to prepare a page image file for the enhanced resolution printer.

While the invention has been shown and described with reference to preferred embodiments thereof, it should be understood that changes in the form and details of the invention may be made therein details of the invention may be made therein without

What is claimed is:

1. A method of augmenting a PostScript page file to enable management of a document at the page level, said document comprised of one or more pages and one or more versions, said method comprising the machine-implemented steps of:

providing for the recognition of a signature within the comment field of each PostScript page file by non-PostScript processing elements, said signature not recognizable by a PostScript interpreter, said signature used to designate data following the signature as document management data, said documet management data including data showing the first version incorporating the page into said document and data indicating whether the page is incorporated in a current version, said signature to enable the creation of page characteristic records from said document management data, said page characteristic records including a document record, version record, and page record for each page, said page record having data attributes including data showing the first version incorporating the page and data indicating whether the page is incorporated in a current version; and providing for the storage of said page characteristic records in a non-PostScript document management database, said page characteristic records including a pointer to the storage location of the corresponding PostScript page file or page image file in a document database, wherein retrieval of said page file or page image file may be accomplished in accordance with the data attributes in said page characteristic record.

2. The method of claim 1 wherein said step of recognizing said signature is performed by a string matching algorithm.

3. The method of claim 1 wherein said signature includes a prefix located at the beginning of a line in said comment field for identifying the remainder of said line as having said document management data included therein.

4. The method of claim 3 wherein said prefix is followed by a keyword that identifies immediately following data as an attribute of said document management data, said attribute to be stored in an appropriate field of said page characteristic record.

5. The method of claim 4 wherein said prefix is %% and said keyword is OutputTagElement:.

6. The method of claim 5 wherein said step of recognizing said signature is performed by a string matching algorithm.

7. An article of manufacture comprising a computer readable medium having embodied therein a method of augmenting a PostScript page file to enable management of a document at the page level, said document comprised of one or more pages and one or more versions, said method comprising the steps of:

providing for the recognition of a signature within the comment field of each PostScript page file by non-PostScript porcessing elements, said signature not recognizable by a PostScript interpreter, said signature used to designate data following the signature as document management data, said document management data including data showing the first version incorporating the page into said document and data indicating whether the page is incorporated in a current version, said signature to enable the creation of page characteristic records from said document management data, said page characteristic records including a document record, version record, and page record for each page, said page record having data attributes including data showing the first version incorporating the page and data indicating whether the page is incorparated in a current version; and providing for the storage of said page characteristic records in a non-Postscript document management database, said page characteristic records including a pointer to the storage location of the corresponding PostScript page file or page image file in a document database, wherein retrieval of said page file or page image file may be accomplished in accordance with the data attributes in said page characteristic record.

8. The article of manufacture of claim 7 wherein said step of recognizing said signature is performed by a string matching algorithm.

9. The article of manufacture of claim 7 wherein said signature includes a prefix located at the beginning of a line in said comment field for identifying the remainder of said line as having said document management data included therein.

10. The article of manufacture of claim 9 wherein said prefix is followed by a keyword that identifies immediately following data as an attribute of said document management data, said attribute to be stored in an appropriate field of said page characteristic record.

11. The article of manufacture of claim 10 wherein said prefix is %% and said keyword is OutputTagElement:.

12. The article of manufacture of claim 11 wherein said step of recognizing said signature is performed by a string matching algorithm.

13. A system for augmenting a PostScript page file to enable management of a document at the page level, said document comprised of one or more pages and one or more versions, said system comprising:

non-PostScript processing elements providing for the recognition of a signature within the comment field of each PostScript page file, said signature not recognizable by a PostScript interpreter, said signature used to designate data following the signature as document management data, said document management data including data showing the first version incorporating the page into said document and data indicating whether the page is incorporated in a current version, said signature to enable the creation of page characteristic records from said document management data, said page characteristic records including a document record, version record, and page record for each page, said page record having data attributes including data showing the first version incorporating the page and data indicating whether the page is incorporate in a current version; and means for the storage of said page characteristic records in a non-PostScript document management database, said page characteristic records including a pointer to the storage location of the corresponding PostScript page file or page image file in a document database, wherein retrieval of said page file or page image file may be accomplished in accordance with the data attributes in said page characteristic record.

14. The system of claim 13 wherein said means for the recognition of a signature includes a string matching algorithm.

15. The system of claim 13 wherein said signature includes a prefix located at the beginning of a line in said comment field to enable means for identifying the remainder of said line as having said document management data included therein.

16. The system of claim 15 wherein said prefix is followed by a keyword to enable means for identifying immediately following data as an attribute of said document management data, said attribute to be stored in an appropriate field of said page characteristic record.

17. The system of claim 16 wherein said prefix is %% and said keyword is OutputTagElement:.

18. The system of claim 17 wherein said means for recognition of a signature includes a string matching algorithm.

* * * * *

UNITED STATES PATENT AND TRADEMARK OFFICE
CERTIFICATE OF CORRECTION

PATENT NO.   :   6,092,089
DATED        :   July 18, 2000
INVENTOR(S)  :   Lahey et al.

It is certified that error appears in the above-identified patent and that said Letters Patent is hereby corrected as shown below:

Inventors:            "Peverly" should be --Peverley--

Signed and Sealed this

Seventeenth Day of April, 2001

Attest:

NICHOLAS P. GODICI

*Attesting Officer*    *Acting Director of the United States Patent and Trademark Office*